(12) United States Patent
Hattori

(10) Patent No.: US 7,436,590 B2
(45) Date of Patent: Oct. 14, 2008

(54) SCANNING LASER MICROSCOPE APPARATUS AND LIGHT-AMOUNT DETECTION UNIT

(75) Inventor: Toshiyuki Hattori, Tokyo (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 11/523,399

(22) Filed: Sep. 19, 2006

(65) Prior Publication Data

US 2007/0081233 A1    Apr. 12, 2007

(30) Foreign Application Priority Data

Sep. 28, 2005 (JP) .............................. 2005-283023

(51) Int. Cl.
*G02B 21/06* (2006.01)
(52) U.S. Cl. ..................................... 359/385
(58) Field of Classification Search ................. 359/385
See application file for complete search history.

(56) References Cited

U.S. PATENT DOCUMENTS 7,196,843 B2 * 3/2007 Nakata ........................ 359/385
2002/0085274 A1 * 7/2002 Sasaki et al. ................. 359/385
2002/0097487 A1 * 7/2002 Arai ............................. 359/385
2005/0012993 A1 * 1/2005 Araya .......................... 359/385
2007/0058054 A1 * 3/2007 Kagayama et al. ...... 348/231.99

FOREIGN PATENT DOCUMENTS

JP        2003-195172 A        7/2003

* cited by examiner

*Primary Examiner*—Joshua L Pritchett
(74) *Attorney, Agent, or Firm*—Frishauf, Holtz, Goodman & Chick, P.C.

(57) ABSTRACT

It is an object to provide a scanning-laser microscope apparatus and a light-amount detection unit that can perform quantitative observation by reporting to the operator the light intensity irradiating a specimen due to optical stimulation. There is provided a laser microscope apparatus including a stimulus optical system for irradiating a stimulus laser beam for applying a stimulus to a specific position of a specimen; a light detector for measuring the light intensity of the stimulus laser beam; a light-intensity correction circuit for correcting the measured value from the light detector; an integrating circuit for integrating the detected value from the light-intensity correction circuit; and a display device for displaying the detected integrated value from the integrating circuit.

15 Claims, 10 Drawing Sheets

FIG. 6

LASER
- ☑ 405 nm  [100] %
- ☐ 488 nm  [5] %
- ☐ 543 nm  [10] %

INTEGRATED VALUES

TARGET VALUE  [10]  J/pix

DETECTED VALUE  [0]  J/pix

SCANNING LASER MICROSCOPE APPARATUS AND LIGHT-AMOUNT DETECTION UNIT

BACKGROUND OF THE INVENTION

1. Field of the Invention

The present invention relates to a scanning-laser microscope apparatus which detects transmitted light or reflected light from a specimen or fluorescence generated in the specimen when the specimen is scanned with a laser beam, and more particularly, to a light-amount detection unit for detecting the amount of light applied to a specimen for optical stimulation.

This application is based on Japanese Patent Application No. 2005-283023, the content of which is incorporated herein by reference.

2. Description of Related Art

A scanning-laser microscope is a microscope which irradiates a specimen with a laser beam while scanning it in the X-axis and Y-axis directions and which detects, using a detector, transmitted light or reflected light from the specimen or fluorescence generated in the specimen to obtain two-dimensional intensity information of the transmitted light, reflected light, or fluorescence. By associating this intensity information with the X-Y scanning position and displaying it on a display or the like as a two-dimensional intensity distribution, it is possible to observe a fluorescence image, a transmittance image, or a reflectance image of the specimen.

In such a scanning-laser microscope, a gas laser, such as an argon laser, is used. This gas laser exhibits variations in the output of the laser beam due to environmental changes, such as temperature changes. Therefore, even though the optical stimulus is to be quantified, quantification is difficult due to the variations in the irradiated laser beam.

To overcome this problem, Japanese Unexamined Patent Application, Publication No. 2003-195172 (hereinafter referred to as "Document 1") discloses a method for stabilizing the laser light amount by monitoring the laser light intensity irradiated for observing a specimen and feeding back the monitored result to the laser light source. According to this method, it is possible to carry out quantitative observation in experiments such as time-lapse observation carried out over an extended period of time.

To quantify the optical stimulus when performing the optical stimulus experiment described above, it is essential to accurately determine the light amount of the stimulus light irradiating the specimen.

However, Document 1 does not discuss quantification of the stimulus.

BRIEF SUMMARY OF THE INVENTION

The present invention provides a scanning-laser microscope apparatus and a light-amount detection unit which are capable of quantitative observation by informing an operator of the light amount irradiating the specimen by optical stimulation.

A first aspect of the present invention provides a laser microscope apparatus comprising an image-acquisition optical system for irradiating a specimen with an observation laser beam; a stimulus optical system for irradiating a stimulus laser beam for applying a stimulus to a specific position of the specimen; a light-intensity measuring unit for measuring the light intensity of the stimulus laser beam; an integrating unit for integrating a measurement value from the light-intensity measuring unit; and a display unit for displaying an integration result of the integrating unit.

According to the laser microscope apparatus described above, because the light intensity of the stimulus laser beam irradiating the specimen is measured and the integrated value of that measured value is displayed, it is possible for the operator to accurately know the light amount irradiating the specimen by optical stimulation. Therefore, it is possible to carry out observation or the like based on a quantitative stimulus.

The light-intensity measuring unit described above corresponds to, for example, a beamsplitter 41, a light detector 42, and a light-intensity correction circuit 43 according to embodiments described below.

In the laser microscope apparatus described above, the light-intensity measuring unit may include a splitting element for splitting off the stimulus laser beam from a light path of the stimulus optical system; a detector for detecting the light intensity of the stimulus laser beam split off by the splitting element; and a correcting unit for converting a detection signal from the detector to a radiated light intensity of the stimulus laser beam at the specimen.

In the laser microscope apparatus described above, the image-acquisition optical system may include a first scanning optical system for scanning the observation laser beam.

The laser microscope apparatus described above may further comprise a storage unit for storing a target integrated value of an irradiation level of the stimulus laser beam at the specimen; a decision unit for determining whether or not a calculation result of the integrating unit is greater than or equal to the target integrated value; and a control unit for controlling the stimulus optical system according to the determination result of the decision unit.

Accordingly, because it is possible to automatically stop the optical stimulus from the stimulus optical system when the light amount irradiating the specimen by optical stimulation is greater than or equal to the target integrated value, the burden placed on the operator can be reduced. In addition, because it is possible to stop the optical stimulus with more accurate timing compared to a case in which the optical stimulus is stopped manually, it is possible to improve the precision of the irradiated optical stimulus.

In the laser microscope apparatus described above, when it is determined by the decision unit that the calculation result is greater than or equal to the target integrated value, the control unit may stop irradiation of the stimulus laser beam from the stimulus optical system.

In the laser microscope apparatus described above, the stimulus optical system may include a second scanning optical system for scanning the stimulus laser beam.

In the laser microscope apparatus described above, when the stimulus laser beam is irradiated by scanning over an irradiation region that is set in advance, the decision unit may perform the determination, for example, for each small region constituting the irradiation region, or it may perform the determination after the stimulus laser beam irradiates the entire irradiation region.

When it is determined whether or not the amount of the optical stimulus laser beam irradiating the small region reaches the target integrated value for each small region constituting the irradiation region, it is possible to accurately apply an optical stimulus with a target light amount to each small region.

As the small regions, it is possible to use pixels which are defined when scanning the irradiation region. Apart from pixels, the irradiation region may be divided into a plurality of regions according to predetermined conditions, and the determination described above may be performed for each of the divided small regions one-by-one.

When determining whether or not the amount of the stimulus laser beam irradiating the entire region reaches the target integrated value after the stimulus laser beam irradiates the entire irradiation region, it is possible to apply the optical stimulus to the entire region at a constant speed. Therefore, it is possible to apply an optical stimulus with a target light amount to the irradiation region while maintaining the quantitativeness of the optical stimulus.

The scanning region described above may be a plurality of locations defined on the specimen. Furthermore, in addition to a predetermined region having an area, the scanning region may be defined as a line, or it may be defined as a point.

The laser microscope apparatus may further include an input unit for setting at least one of the irradiation region of the stimulus laser beam and the target integrated value.

Because such an input unit is provided, the operator can set a desired value as the irradiation region or the target integrated.

The laser microscope apparatus described above may further comprise a laser-irradiation-conditions determining unit for determining an irradiation time and intensity of the stimulus laser beam based on the target integrated value, wherein the control unit controls the stimulus optical system based on the irradiation time and the intensity determined by the laser-irradiation-conditions determining unit.

Because the optimal laser irradiation time and laser intensity can be automatically determined based on the target integrated value, it is possible to achieve optical stimulation with good efficiency.

A second aspect of the present invention is a light-amount detection unit used in a laser microscope including a stimulus optical system for irradiating a stimulus laser beam for applying a stimulus to a specific position of a specimen, the light-amount detection unit comprising a light-intensity measuring unit for measuring a light intensity of the stimulus laser beam; an integrating unit for integrating a measured value from the light-intensity measurement unit; and an output unit for outputting an integration result of the integrating unit.

According to the light-amount detection unit described above, the light intensity of the optical stimulus laser beam irradiating the specimen is measured and the integrated value of the measured value is output. Therefore, by displaying the integrated value on a display device or the like in a device which receives the integrated value, it is possible to inform the operator of the light amount irradiating the specimen by optical stimulation.

According to the present invention, because information about the light amount irradiating the specimen by optical stimulation is provided, an advantage is afforded in that it is possible to carry out quantitative observation.

BRIEF DESCRIPTION OF THE SEVERAL VIEWS OF THE DRAWINGS

FIG. 6 is a diagram showing an example of a condition-setting panel displayed on a condition-setting screen according to the second embodiment of the present invention.

DETAILED DESCRIPTION OF THE INVENTION

Embodiments of the present invention will be described below with reference to the drawings.

First Embodiment

Figure 1:
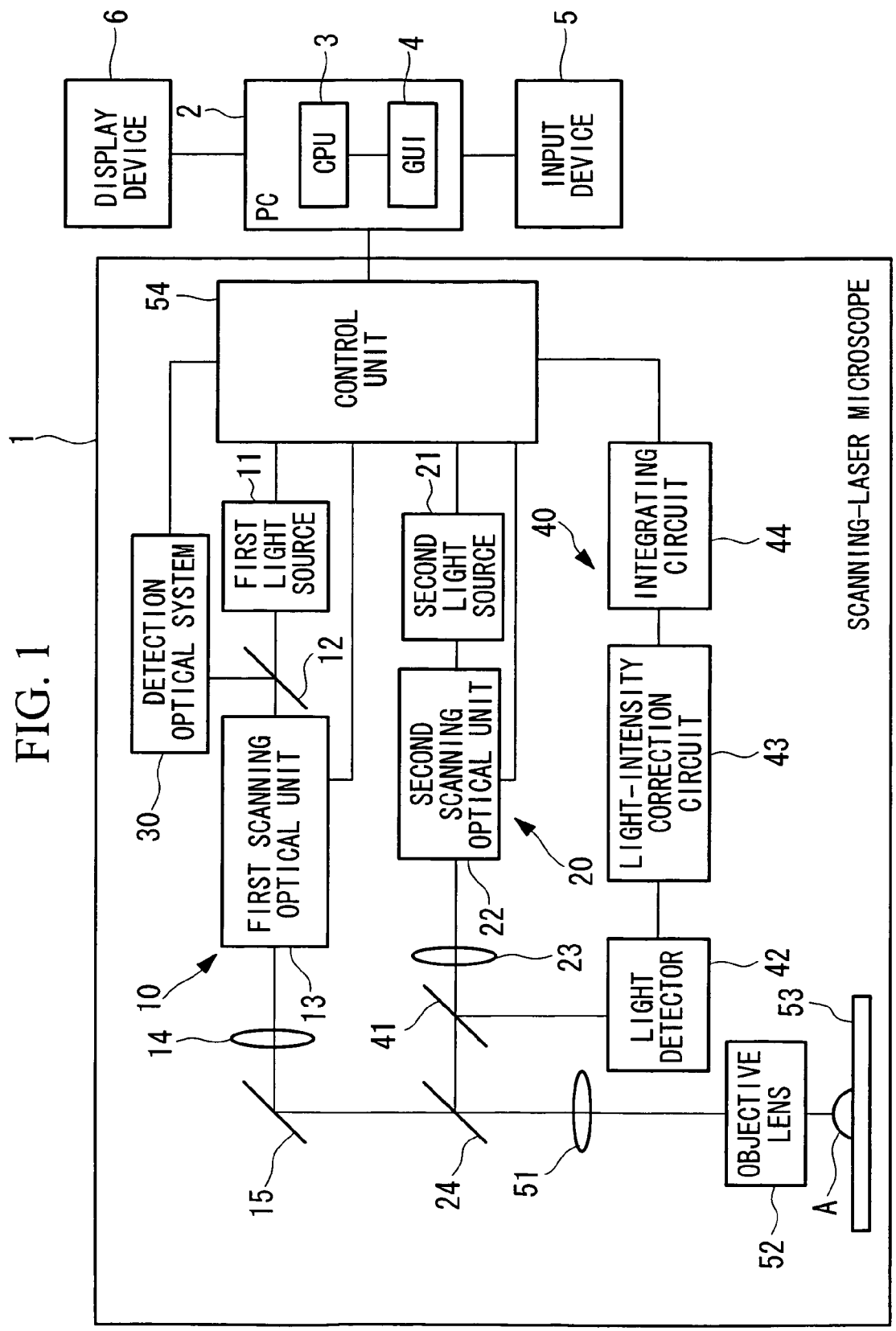
FIG. 1 is a block diagram showing, in outline, the configuration of a scanning-laser microscope apparatus according to a first embodiment of the present invention.

FIG. 1 is a block diagram showing, in outline, a laser microscope apparatus according to a first embodiment of the present invention.

The laser microscope apparatus according to this embodiment is formed of a scanning-laser microscope 1 and a computer 2.

The scanning-laser microscope 1 includes an image-acquisition optical system 10 for irradiating an image-acquisition laser beam while two-dimensionally scanning it on a focal plane on a specimen, a stimulus optical system 20 for irradiating the specimen with a stimulus laser beam for applying a stimulus to the specimen, a detection optical system 30 for detecting reflected light from the specimen, and a light-amount measuring apparatus 40 for measuring the light amount of the stimulus laser beam.

The image-acquisition optical system 10 is formed of a first light source 11, a dichroic mirror 12, a first scanning optical unit (first scanning optical system) 13, a relay lens 14, and a mirror 15.

The stimulus optical system 20 is formed of a second light source 21, a second scanning optical unit (second scanning optical system) 22, a relay lens 23, and a dichroic mirror 24. The dichroic mirror 24 has characteristics such that it transmits light having a wavelength equal to or greater than that of the laser beam from the image-acquisition optical system 10 and reflects the wavelength of the laser beam from the stimulus optical system 20.

The detection optical system 30 is disposed in the split off light path of the dichroic mirror 12 in the image-acquisition optical system 10. This detection optical system 30 is formed of, for example, a photometric filter, a lens, a confocal pinhole, and a photo-electric conversion device.

The light-amount measuring apparatus 40 is formed of a beamsplitter (splitting element) 41, a light detector (detector) 42, a light-intensity correction circuit (correction unit) 43, and an integrating circuit (integrating unit) 44. The beamsplitter 41 is disposed in the light path of the stimulus laser beam emitted from the stimulus optical system 20. The beamsplitter 41 is constructed so as to transmit, for example 80% of the incident light and reflect 20%.

In this scanning-laser microscope 1, an optical axis of the image-acquisition optical system 10 and an optical axis of the stimulus optical system 20 are combined by the dichroic mirror 24 and lead to an image-forming lens 51 and an objective lens 52. The focal positions of the relay lenses 14 and 23 are disposed so as to be coincident with the focal position of the image-forming lens 51. A specimen A is mounted on a stage 53 which can be raised and lowered.

The image-acquisition optical system 10, the stimulus optical system 20, the detection optical system 30, and the light-amount measuring apparatus 40 are connected to a control unit 54. The scanning-laser microscope 1 is connected to the computer 2 via the control unit 54.

The computer 2, as well as having a CPU 3 and GUI 4, also includes a recording device which is not shown in the drawing. The computer 2 is connected to an input device 5 and a display device 6. The input device 5 includes a keyboard, a mouse, or the like. The display device 6 includes a frame memory and a display.

More specifically, the CPU 3 in the computer 2 is connected to a memory such as a RAM (Random Access Memory) and so on, or to a secondary storage device such as an HD (Hard Disk), a ROM (Read Only Memory), or the like, which are not shown in the drawing.

Various application programs, for instance, are stored in the secondary storage device. The CPU 3 reads out an application program from the secondary storage device into the memory and executes it to realize various types of processing, which will be described later.

The GUI 4, which is a display function provided for the computer 2, displays a condition-setting screen (described later) on the display of the display device 6, and supports input processing of a target integrated value or the like by the operator.

The operation of the above scanning-laser microscope apparatus will be described next.

First, when a control command instructing commencement of fluoroscopy is input to the control unit 54 in the scanning-laser microscope 1 from the CPU 3 in the computer 2, fluoroscopy is commenced by controlling each unit of the image-acquisition optical system 10 with the control unit 54. During this fluoroscopy, the laser beam emitted from the first light source 11 is guided to the first scanning optical system where it is scanned by deflecting it in a desired direction. The laser beam is then focused onto a sectional plane of the specimen A, which is fixed on the stage 53, via the relay lens 14, the mirror 15, the dichroic mirror 24, the image-forming lens 51, and the objective lens 52 and is two-dimensionally scanned within the sectional plane.

By introducing into the specimen A a fluorescent indicator that is excited by the wavelength of the first light source 11 and by two-dimensionally scanning the laser beam within the sectional plane, the fluorescent indicator is excited and generates fluorescence. The fluorescence, which is collected by the objective lens 52, travels in the reverse direction along the same optical path as the above-mentioned laser beam, passes through the objective lens 52, the image-forming lens 51, and the dichroic mirror 24, and is guided to the dichroic mirror 12 via the mirror 15, the relay lens 14, and the first scanning optical unit 13. The dichroic mirror 12 has characteristics such that it reflects light with wavelengths longer than the wavelength of the laser light emitted from the first light source 11, and therefore, the fluorescence is reflected by the dichroic mirror 12 and is guided towards the detection optical system 30.

In the detection optical system 30, light of a specific wavelength in the fluorescence is selectively transmitted by the photometric filter, then the lens, and only light from the sectional plane is selected by the confocal pinhole and is incident on the photo-electric converting element, where it is converted into an electrical signal. The output signal from the photo-electric converting element is guided to an A/D converter and is then supplied to the computer 2 via the control unit 54. The CPU 3 in the computer 2 creates image data based on a digital signal from the detection optical system 30 and outputs this image data to the display device 6. By displaying the image signal from the CPU 3 on the display, the display device 6 provides a fluorescence image (two-dimensional distribution of the fluorescence intensity) of the sectional plane of the specimen to the operator in the form of an image.

During the course of such fluoroscopy, when a control command instructing optical stimulation is applied to the control unit 54 from the CPU 3, each unit of the stimulus optical system 20 is controlled by the control unit 54, and optical stimulation commences.

This optical stimulation will be described in detail below.

First, upon commencing optical stimulation, various types of condition setting are carried out by the operator. This condition setting is performed using a condition-setting screen which the GUI 4 of the computer 2 displays on the display device 6.

Figure 3:
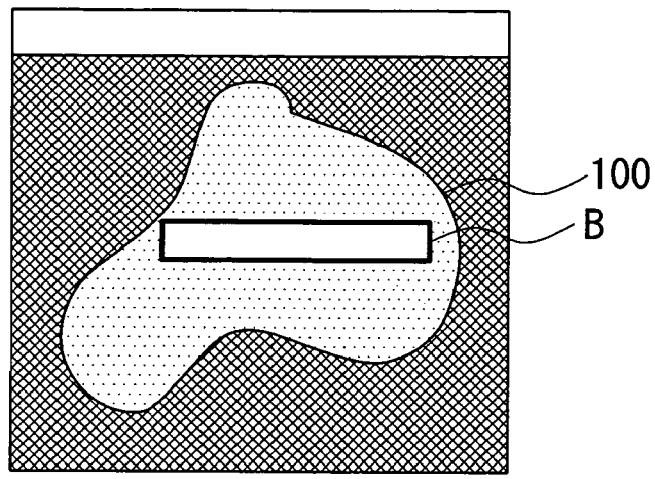
FIG. 3 is a diagram showing an example of a screen for specifying an irradiation region of a stimulus laser beam on a condition-setting screen according to the first embodiment of the present invention.

FIG. 3 shows an example of the condition-setting screen. As shown in this figure, a pre-scanned image 100 of the specimen A is displayed on the condition-setting screen.

By operating the mouse or the like provided in the input device 5, the operator specifies (step SA1 in FIG. 2) on the condition-setting screen a region where optical stimulation is to be performed, in other words, a region B on the specimen to be irradiated with the stimulus laser beam (hereinafter referred to as "irradiation region").

Figure 4:
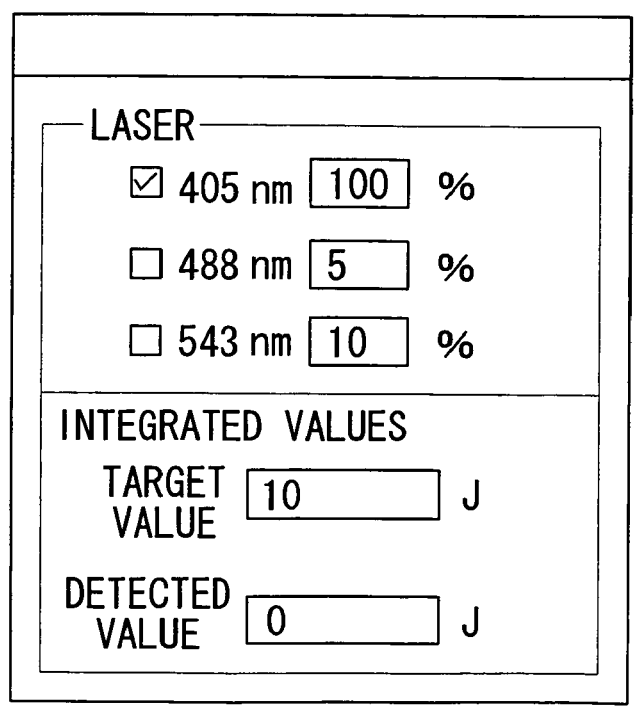
FIG. 4 is a diagram showing an example of a condition-setting panel displayed on the condition-setting screen according to the first embodiment of the present invention.

When the user specifies the irradiation region, the GUI 4 displays the specified region B on the prescan image of the specimen 100, and then displays a condition-setting panel corresponding to the specified irradiation region B on the screen. FIG. 4 shows an example of the condition-setting panel. As shown in this figure, input setting boxes for the type of laser (wavelength) that can be used for the stimulus, the intensity of the laser beam, and a target integrated value are displayed on the condition-setting panel.

The operator selects, on this condition-setting panel, the laser to be used for the stimulus (step SA2 in FIG. 2), specifies the intensity of the laser beam (step SA3), and then inputs a target integrated value for the stimulus laser beam that irradiates the specified region (step SA4).

Once the various types of condition setting described above have been completed, the GUI 4 outputs this setting information to the CPU 3. The CPU 3 stores the target integrated value of the stimulus laser beam, obtained from the GUI 4, in a memory (storage unit) in the computer 2, and commences optical stimulation with a predetermined timing (step SA5).

When commencing optical stimulation, the CPU 3 generates control signals for controlling each component of the stimulus optical system 20 in the scanning-laser microscope 1 based on the set conditions, and outputs these control signals to the control unit 54. By doing so, the stimulus laser beam from the second light source 21 in the stimulus optical system 20 is emitted and guided to the second scanning optical unit 22. The stimulus laser beam guided to the second scanning optical unit 22 is scanned by deflecting it in a desired direction and is then guided to the beamsplitter 41 via the relay lens 23, and 80% thereof is transmitted and guided to the dichroric mirror 24. The stimulus laser beam guided to the dichroric mirror 24 is combined with the optical axis from the image-acquisition laser scanning unit 13. Then, it is transmitted through the image-forming lens 51 and the objective lens 52 and is irradiated on the sectional plane in the specimen A. Regarding the irradiated position in the sectional plane at this time, it is possible to select any position independent of the scanning position of the first scanning unit 13 by controlling the second scanning optical unit 22.

On the other hand, the 20% of the stimulus laser beam guided to the beamsplitter 41 is guided to the light detector 42 of the light-amount measuring apparatus 40, where the light intensity thereof is measured. The light intensity detected by the light detector 42 is corrected by the light-intensity correction circuit 43. The light-intensity correction circuit 43, for example, stores the transmittance, which is a characteristic, of the beamsplitter 41 and corrects the detected value from the light detector 42 using this transmittance. In this embodiment, because the transmittance of the beamsplitter 41 is 80% and the reflectance is 20%, the light intensity of the stimulus laser beam irradiating the specimen A is calculated by multiplying the detected value from the light detector 42 by a factor of four.

The characteristic of the beamsplitter 41 may be stored in the light-intensity correction circuit 43 in advance, or it may be stored in a recording device in the computer 2 and sent to the light-intensity correction circuit 43 via the control unit 54 at the same times as commencing optical stimulation.

The light intensity data corrected by the light-intensity correction circuit 43 is supplied to the integrating circuit 44. By integrating the light intensity data obtained from the light-intensity correction circuit 43, the integrating circuit 44 obtains an integrated value of the light intensity of the stimulus laser beam irradiating the specimen A. The integrated value calculated by the integrating circuit 44 is sent to the CPU 3 in the computer 2 via the control unit 54 as a detected integrated value. The CPU 3 outputs the detected integrated value from the integrating circuit 44 to the display device 6. Thus, the detected integrated value of the stimulus laser beam irradiating the specimen A is displayed on the display of the display device 6 in real time (step SA6 in FIG. 2).

Figure 2:
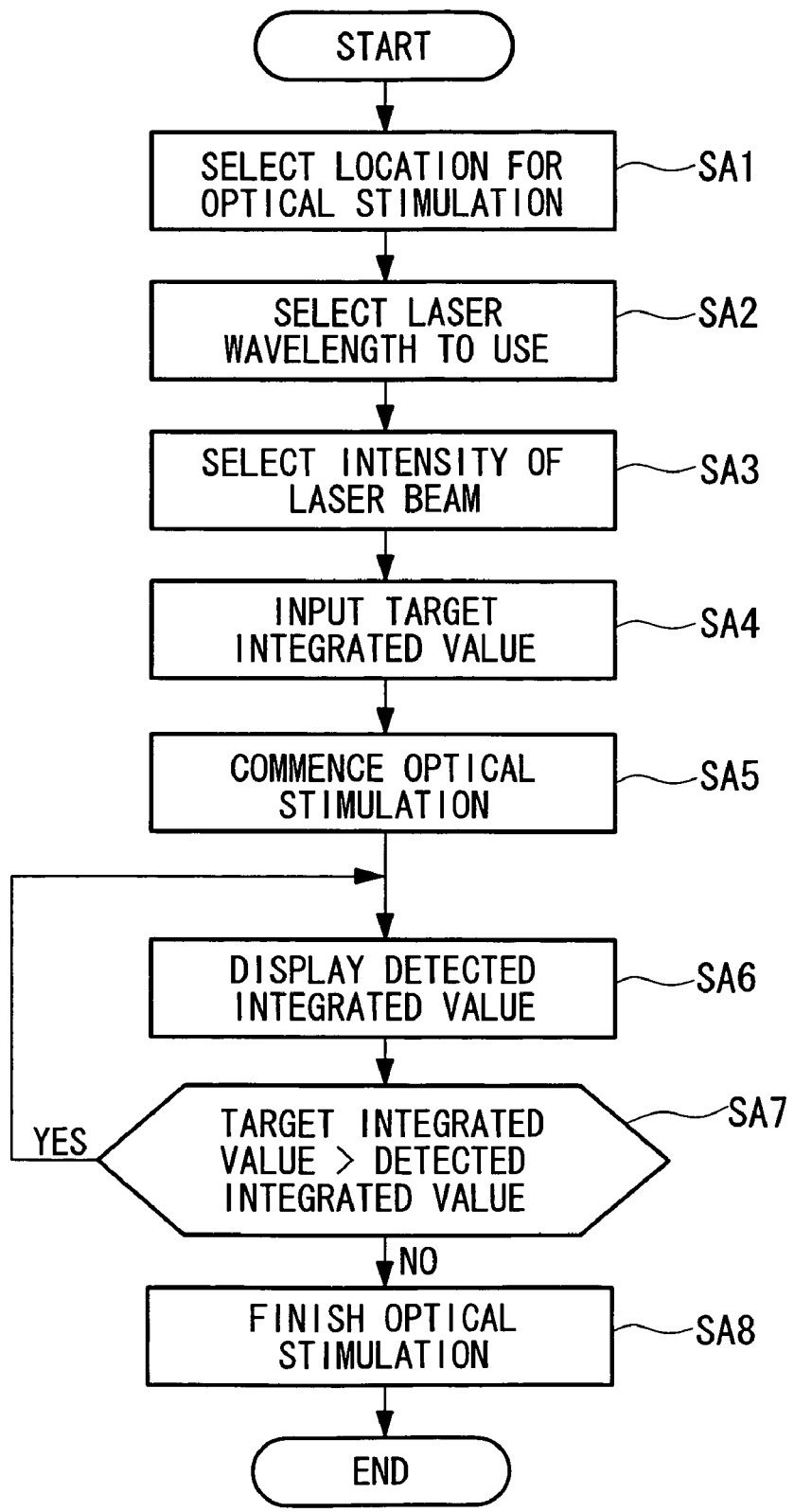
FIG. 2 is a flowchart showing the operation of the scanning-laser microscope apparatus according to the first embodiment of the present invention.

The CPU 3 then determines whether or not the detected integrated value received from the light-amount measuring apparatus 40 is equal to or greater than the target integrated value (step SA7 in FIG. 2). If, it is determined that the detected integrated value is less than or equal to the target integrated value ("YES" at step SA7), optical stimulation continues; on the other hand, if the detected integrated value is greater than or equal to the target integrated value, a control signal for stopping the operation of the optical-stimulus optical system 20 is generated and output to the control unit 54. This completes the optical stimulation by the optical-stimulus optical system 20 (step SA8 in FIG. 2)

As described above, with the scanning-laser microscope apparatus according to this embodiment, because the light amount of the stimulus laser beam irradiating the specimen A is displayed on the display of the display device 6, it is possible for the operator to know the light amount of the stimulus laser beam irradiating the specimen A. It is thus possible to perform stimulation quantitatively.

If the detected integrated value from the light-amount measuring apparatus 40 reaches the target integrated value input by the operator, the stimulus optical system 20 is automatically stopped. Therefore, it is possible to control the optical stimulation with high precision, and it is possible to realize high-precision experiments.

Second Embodiment

Next, a scanning-laser microscope apparatus according to a second embodiment of the present invention is described. In the first embodiment described above, the target integrated value is input for the entire irradiation region. This embodiment, however, differs from the embodiment described above in that the setting of the target integrated value is input as a value for each pixel in the irradiated region.

In the scanning-laser microscope apparatus of this embodiment, only the parts that differ from those in the first embodiment above will be described.

Figure 5:
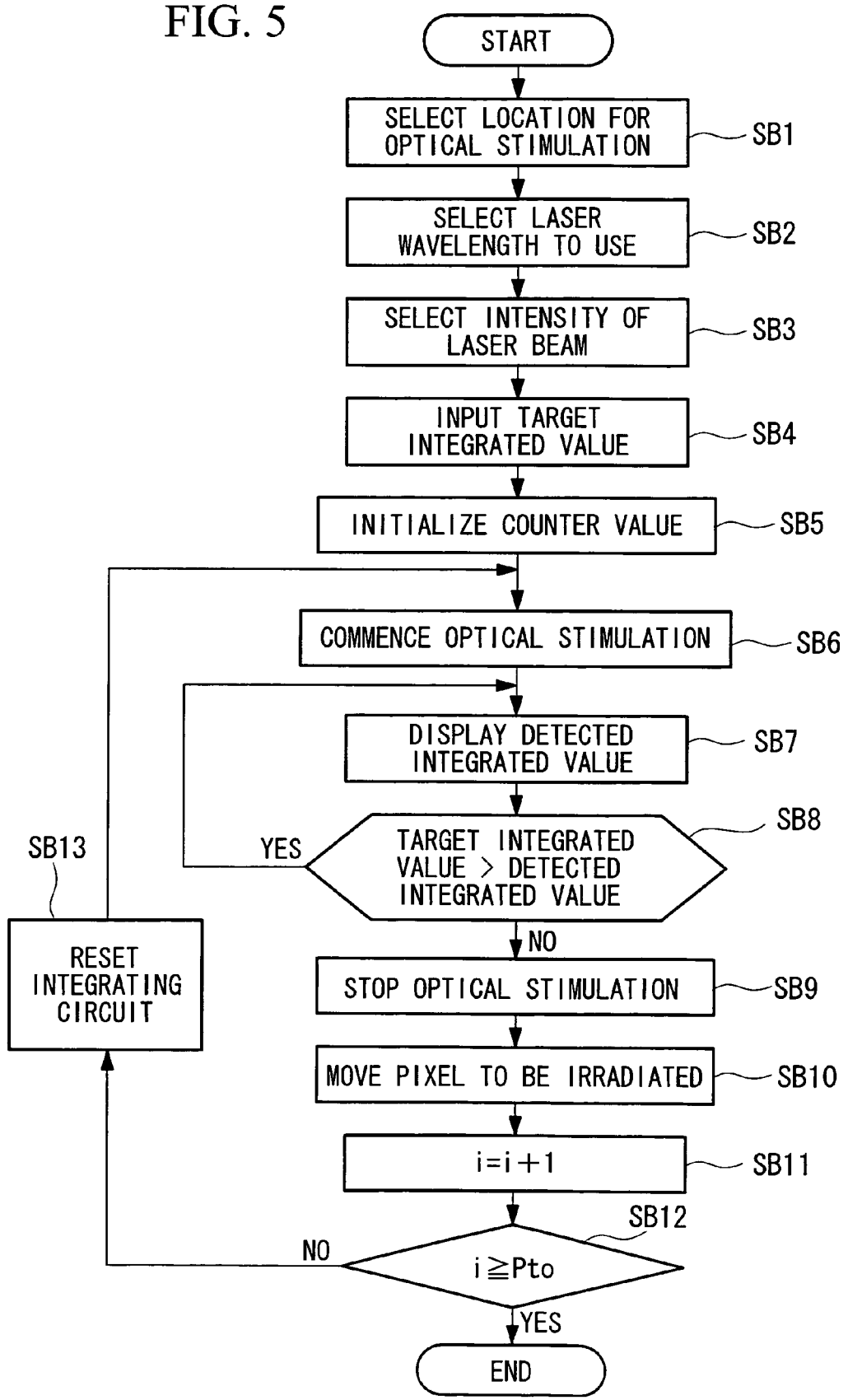
FIG. 5 is a flowchart showing the operation of a scanning-laser microscope apparatus according to a second embodiment of the present invention.

First, at step SB1 in FIG. 5, similarly to step SA1 shown in FIG. 2 described above, when specifying the irradiated region, the GUI 4 displays a condition-setting panel on the display of the display device 6 in step SB2. FIG. 6 shows an example of the condition-setting panel according to this embodiment. As shown in this figure, in addition to a selection switch for the type of laser (wavelength) and an input box for the intensity of the laser beam, an input box for inputting a target integrated value for each pixel is also provided. Here, one pixel is the minimum unit of image data when converting the information about the light detected in the detection optical system 30 to an image. In this embodiment, it is determined from the line scan width of the laser, as well as number of data samplings in one line implemented in the detection optical system 30.

When the type of laser, the laser intensity, and the target integrated value per pixel are input by the operator on the condition-setting panel shown in FIG. 6 (steps SB2 to SB4 in FIG. 5), the GUI 4 outputs this setting information to the CPU 3. When the CPU 3 obtains the information related to the set conditions from the GUI 4, it detects the number of pixels in the irradiation region, and saves the detected number of pixels as a total pixel count Pto.

Then, the CPU 3 initializes a counter (step SB5 in FIG. 5). In the initialization of this counter, the value of a pixel counter for counting the number of pixels irradiated with the optical stimulus laser beam is reset to zero, and the integrated value of the integrating circuit 44 provided in the light-amount measuring apparatus 40 in the scanning-laser microscope 1 is reset.

When the initialization described above is completed, the CPU 3 performs optical stimulation of one pixel constituting the irradiation region, generates a control signal based on the condition settings from the GUI 4, and outputs it to the control unit 54. Accordingly, irradiation of the stimulus laser beam is performed in a concentrated manner at one pixel in the irradiation region (step SB6 in FIG. 5).

Detection of the stimulus laser beam by the light-amount measuring apparatus 40 commences together with irradiation of the stimulus laser beam described above, and the detected integrated value from the integrating circuit 44 is sent to the CPU 3 via the control unit 54. The CPU 3 displays this detected integrated value on the display device 4 (step SB7). As a result, the integrated value measured by the light-amount measuring apparatus is displayed in real time in the detected value in an integrated-value display box shown at the bottom of FIG. 6.

The CPU 3 then determines whether or not this detected integrated value has reached the target integrated value set in step SB4 (step SB8). If, as a result, the detected integrated value has not reached the target integrated value, optical stimulation of that pixel continues; on the other hand, if the detected integrated value has reached the target integrated value, a control signal for stopping the operation of the optical-stimulus optical system 2 is generated and output to the computer unit 54. Accordingly, the optical stimulation by the optical-stimulus optical system 2 is stopped (step SB9).

Next, the CPU 3 moves the position irradiated with the optical stimulus laser beam to a neighboring pixel (step SB10), and the value of the pixel counter is incremented by "1" (step SB11). Then, the CPU 3 determines whether or not the value of the pixel counter is at or below the total pixel count Pto (step SB12). If, as a result, the value of the pixel counter is less than the total pixel count Pto, the integrating circuit 44 is reset (step SB13), the process returns to step SB6, and optical stimulation is carried out until the target integrated value for the current pixel is reached.

When the optical stimulation at all pixels constituting the irradiation region is completed, "YES" is obtained at step SB12, and the optical stimulation process ends.

As described above, with the scanning-laser microscope apparatus according to this embodiment, because light amount adjustment of the optical stimulus can be performed in units of pixels, it is possible to perform high-precision optical stimulation. In addition, because the scanning of the optical stimulus is performed automatically, it is possible to reduce the burden placed on the operator.

In the embodiment described above, the determination as to whether or not the detected integrated value has reached the target integrated value is carried out at each pixel; however, the timing at which this determination is carried out is not necessarily limited to one pixel. For example, the irradiation region may be divided according to predetermined conditions and the determination carried out in each divided region.

Third Embodiment

Next, a scanning-laser microscope according to a third embodiment of the present invention is described. In the second embodiment described above, the determination as to whether or not the detected integrated value reaches the target integrated value is carried out at each pixel. This embodiment, however, differs from the embodiment described above in that the determination as to whether or not the detected integrated value has reached the target integrated value is carried out after the stimulus laser beam is irradiated while scanning over the entire irradiation region.

For the scanning-laser microscope apparatus according to this embodiment, only the parts that are different from those in the above-mentioned second embodiment will be described below.

Figure 7:
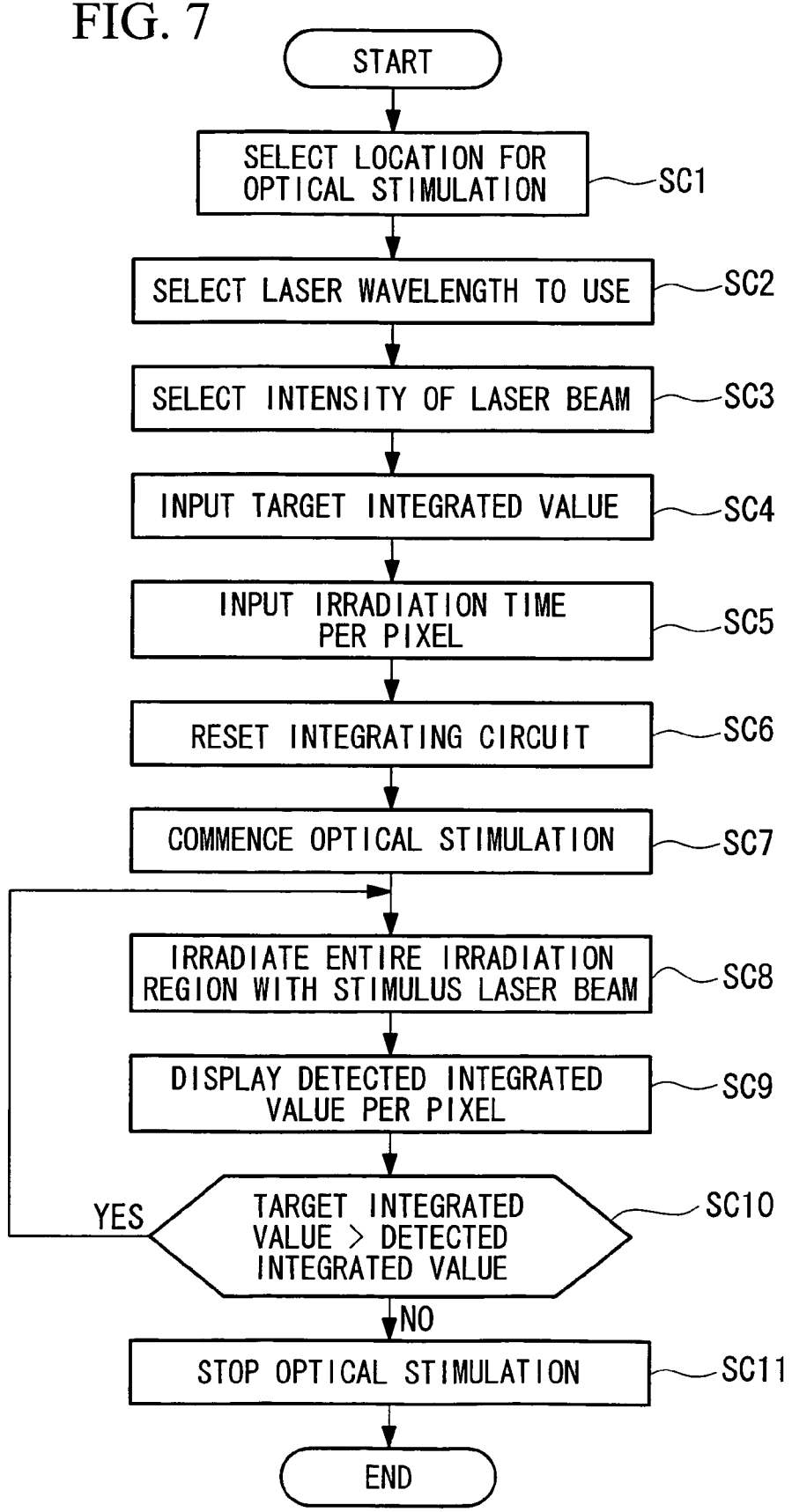
FIG. 7 is a flowchart showing the operation of a scanning-laser microscope apparatus according to a third embodiment of the present invention.
Figures 8, 9:
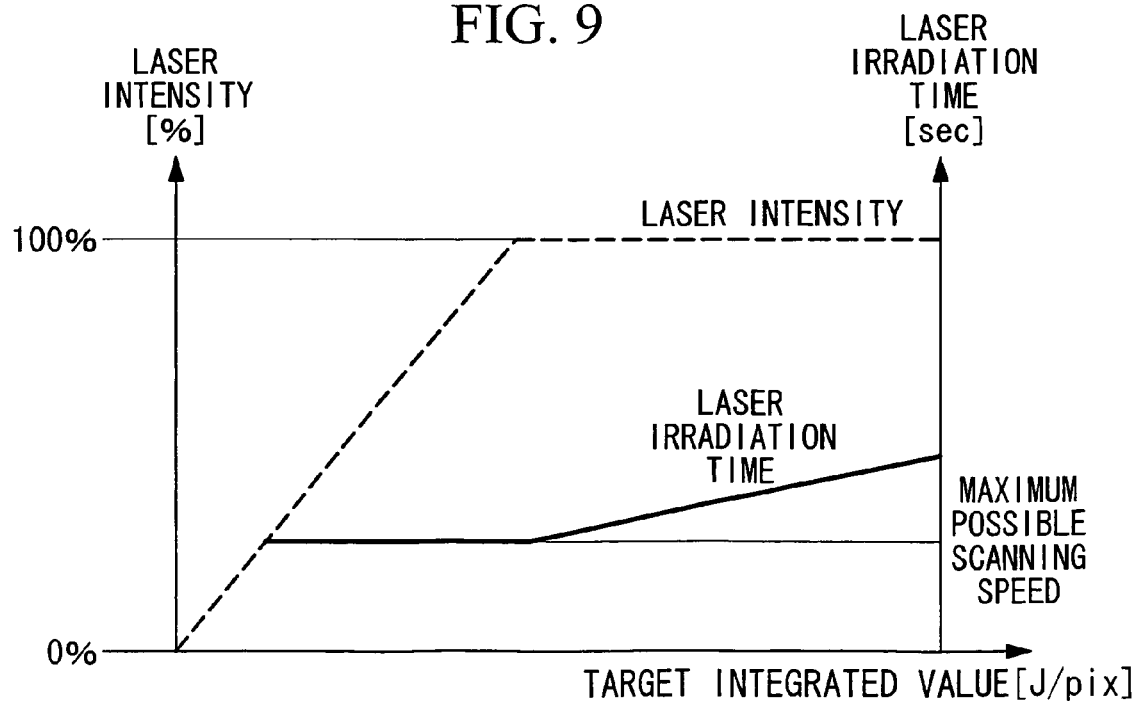
FIG. 8 is a diagram showing an example of a condition-setting panel displayed on a condition-setting screen according to the third embodiment of the present invention.
FIG. 9 is a diagram showing a table used for setting the optimal laser irradiation time and laser intensity based on a target integrated value.

In step SC1 in FIG. 7, similarly to step SB1 shown in FIG. 5, when specifying the irradiation region, the GUI 4 displays a condition-setting panel on the display of the display device 6 in step SC2. FIG. 8 shows an example of the condition-setting panel in this embodiment. As shown in this figure, in addition to a selection switch for the type of laser (wavelength), an input box for the laser light intensity, and an input box for inputting a target integrated value per pixel, the condition-setting panel is also provided with an irradiation-time input box for inputting an irradiation time per pixel.

When the type of laser, the laser intensity, the target integrated value per pixel, and the irradiation time per pixel are input by the user in this condition-setting panel (steps SC2 to SC5 in FIG. 5), the GUI 4 outputs this setting information to the CPU 3. The CPU 3, upon obtaining the information related to the set conditions from the GUI 4, detects the number of pixels at the site specified as the irradiation region, stores the detected number of pixels as a total pixel count Pto, and resets the integrating circuit (step SC6).

The CPU 3 then commences optical stimulation of the irradiation region, generates control signals based on the above-mentioned condition settings, and outputs them to the control unit 54. Accordingly, the stimulus laser beam is continuously irradiated while being two-dimensionally scanned over the entire irradiation region (step SC7). The laser irradiation time for each pixel at this time is controlled to the time set in step SC5 described above.

Detection of the stimulus laser beam by the light-amount measuring apparatus 40 commences when commencing the irradiation, and the detected integrated value is sent to the CPU 3 via the control unit 54. The CPU 3, by dividing the detected integrated value by the total pixel count Pto described above, calculates the detected integrated value per pixel and displays the calculation result on the display device 6. The result, that is, the detected integrated value per pixel, is displayed in an integrated-value display box shown at the middle of FIG. 8.

The CPU 3 then determines whether or not the detected integrated value per pixel has reached the target integrated value (step SC10). If, as a result, the detected integrated value has not reached the target integrated value ("YES" at step SC10), the process returns to step SC8, and optical stimulation continues. Thus, the CPU 3 continues optical stimulation of the irradiation region until the detected calculated value reaches the target integrated value.

When the detected integrated value reaches the target integrated value ("NO" at step SC10), a control signal for stopping the operation of the optical-stimulus optical system 2 is generated and output to the computer unit 54. This completes optical stimulation by the optical-stimulus optical system 2 (step SC11).

As described above, with the scanning-laser microscope according to this embodiment, it is possible to realize continuous optical stimulation by continuously scanning the stimulus laser beam. Therefore, it is possible to continuously perform optical stimulation until the target integrated value is reached, while maintaining the quantitative characteristics over time.

In the third embodiment described above, the operator sets the laser intensity and the laser irradiation time per pixel. However, it is also possible to use a configuration in which the irradiation time and the laser intensity are set automatically according to a target integrated value per pixel.

For example, the computer 2 may include a table in which the target integrated value, the laser intensity, and the irradiation time are associated, as shown in FIG. 9, and using this table, the CPU 3 may determine the optimal laser intensity and irradiation time according to the target integrated value.

In the table shown in FIG. 9, the target integrated value is shown along the horizontal axis, and the laser intensity and irradiation time are shown along the vertical axis. In FIG. 9, the laser intensity is given priority over the laser irradiation time and adjusted. In other words, in a range where the target integrated value is comparatively small, the laser irradiation time is set to a minimum time determined based on the scan-speed limit of the second scanning optical unit 22, and the laser intensity is gradually increased. On the other hand, in a range where the target integrated value is large, because the desired target integrated value cannot be obtained even when the laser intensity is set to 100%, in this case it is adjusted so as to reach the target integrated value by gradually increasing the laser irradiation time.

In this way, by determining the laser intensity and the laser irradiation time according to the target integrated value, it is possible to irradiate the stimulus laser beam with the optimal laser irradiation conditions. Therefore, it is possible to improve the experimental efficiency.

Figure 10:
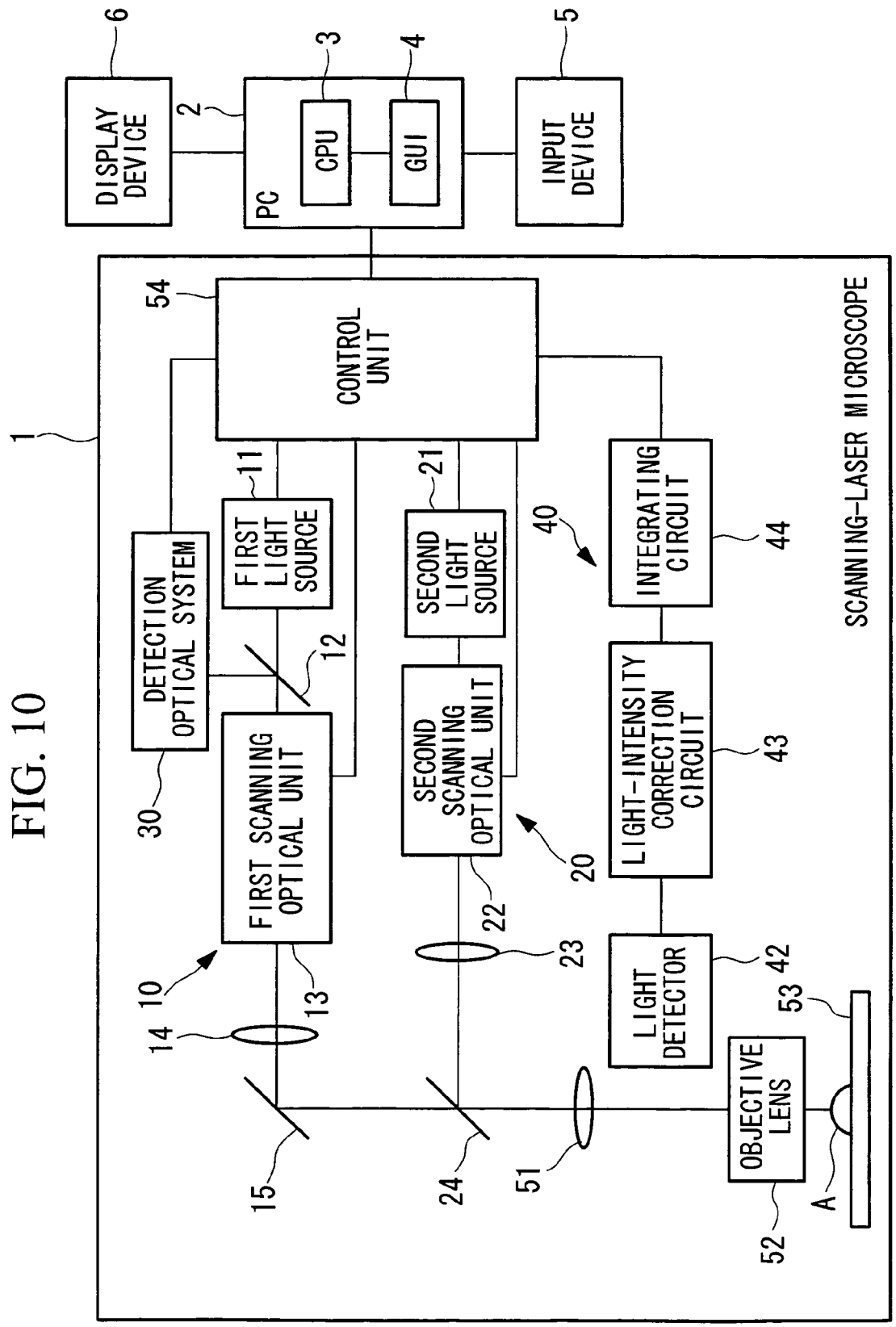
FIG. 10 is a diagram showing an example configuration in a case where the position of the beamsplitter in the scanning-laser microscope apparatus shown in FIG. 1 is changed.

In the first to third embodiments described above, the beamsplitter 41 of the light-amount measuring apparatus 40 is provided between the relay lens 23 and the dichroic mirror 24 in the light path of the stimulus laser beam. However, the location of this beamsplitter 41 is not particularly limited to the light path of the stimulus laser beam. For example, it may be placed between the second light source 21 and the second scanning optical unit 22, or it may be placed between the second scanning optical unit 22 and the relay lens 23. Furthermore, as shown in FIG. 10, it may be provided in the light path of the combined image-acquisition laser beam and the stimulus laser beam, in other words, between the dichroic mirror 24 and the objective lens 52. FIG. 10 shows a case in which the beamsplitter 41 is located between the image-forming lens 51 and the objective lens 52.

As shown in FIG. 10, when the beamsplitter 41 is located in the light path of the combined image-acquisition laser beam and the stimulus laser beam, it is necessary to provide a filter which selectively transmits only the wavelength of the stimulus laser beam between the beamsplitter 41 and the detector 42. Instead of the beamsplitter 41, it is possible to eliminate the need for the above-mentioned filter 45 by using a dichroic mirror which reflects only the wavelength of the stimulus laser beam.

By making the detection position of the stimulus laser beam closer to the specimen A in this way, it is possible to eliminate the effects of deterioration of the light due to noise or the like, and it is thus possible to increase the detection precision.

Figure 11:
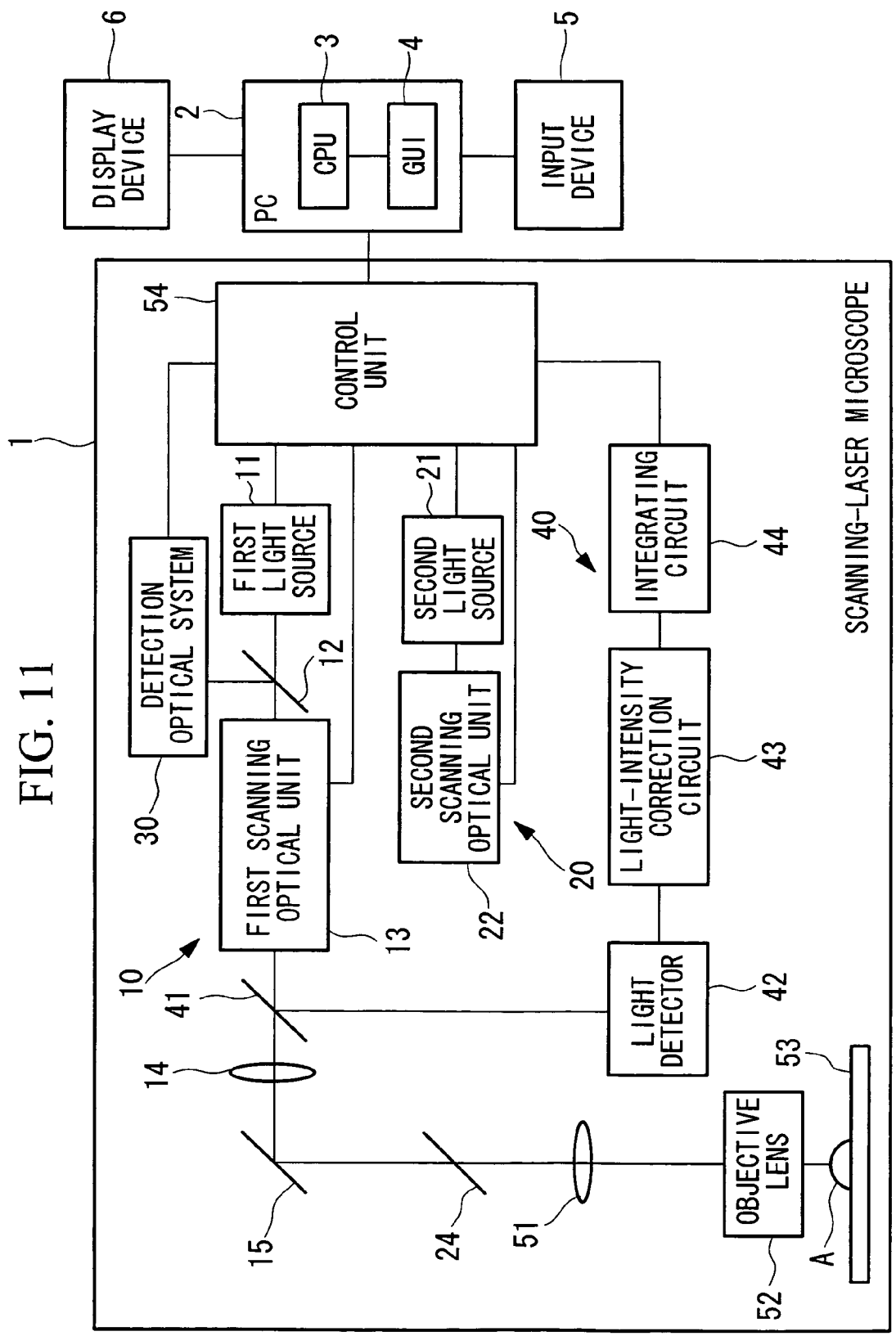
FIG. 11 is a diagram showing an example configuration of a scanning-laser microscope apparatus in a case where a specimen is irradiated with an image-acquisition laser beam and a stimulus laser beam using a single scanning optical system.
Figure 12:
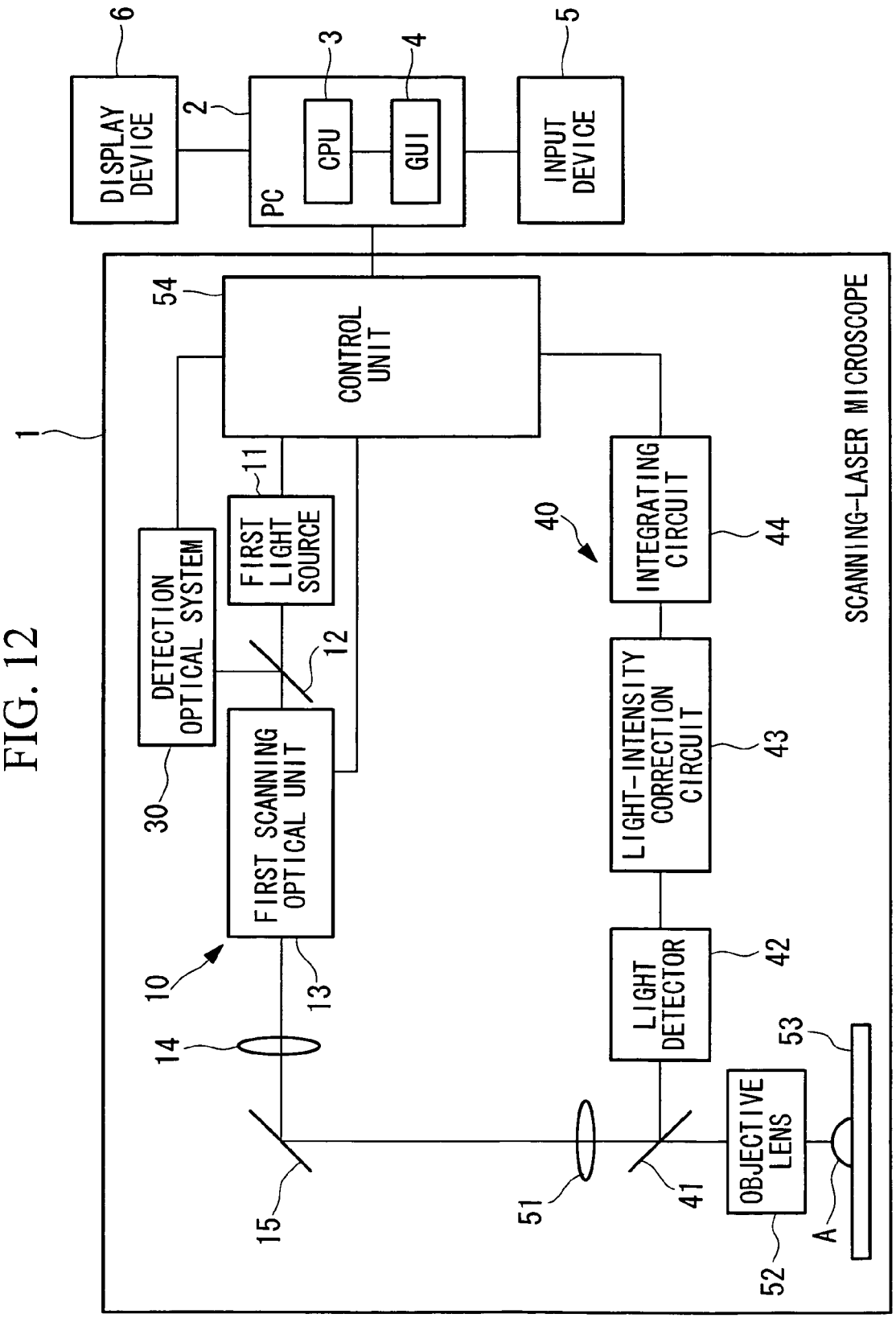
FIG. 12 is a diagram showing an example configuration of a scanning-laser microscope apparatus in a case where the specimen is irradiated with an image-acquisition laser beam and a stimulus laser beam using a single scanning optical system.

The scanning-laser microscope 1 of this embodiment is not limited to the configuration including two scanning optical systems, as shown in FIGS. 1 and 10. For example, as shown in FIGS. 11 and 12, it is also possible to use a configuration in which the image-acquisition laser beam and the stimulus laser beam are irradiated using a single scanning optical system. In this case also, by placing the beamsplitter 41 in the light path of the stimulus laser beam and detecting this light, it is possible to achieve the same effects as the scanning-laser microscope apparatuses according to the first to third embodiments described above. In FIG. 11, the beamsplitter 41 is located between the first scanning optical unit 13 and the relay lens 14, and in FIG. 12, the beamsplitter 41 is located between the image-forming lens 51 and the objective lens 52. However, the location of the beamsplitter 41 is not particularly limited.

Although embodiments of the present invention have been described above with reference to the drawings, the specific construction is not limited to these embodiments; various design changes and so forth are also included so long as their scope does not depart from the spirit of the invention.

First, in the first to third embodiments described above, irradiation regions may be set at a plurality of locations on the specimen A. When the irradiation regions are set at a plurality of locations in this way, it is possible to set a target integrated value for each irradiation region.

Second, the irradiation region may be set to a predetermined region having an area, or it may be set to a single point or a line.

Third, the number of stimulus optical systems 20 is not limited to one; two or more may be used.

Fourth, pulsed lasers can be used as the first light source 11 and the second light source 21 described above.

Fifth, the image-acquisition optical system described above need not be provided with a scanning optical system. For example, in this invention, it is possible to employ a laser microscope which performs fluoroscopy using a CCD camera. Furthermore, the stimulus optical system need not be provided with a scanning optical system either. It may be an optical system having a construction in which only a single point is irradiated in a concentrated manner.

What is claimed is:

1. A laser microscope apparatus comprising:
   an image-acquisition optical system for irradiating a specimen with an observation laser beam;
   a stimulus optical system for irradiating a stimulus laser beam for applying a stimulus to a specific position of the specimen;
   a light-intensity measuring unit for measuring a light intensity of the stimulus laser beam;
   an integrating unit which integrates light intensity data output over time by the light-intensity measuring unit to calculate a total light amount of the stimulus laser beam that has irradiated the specimen; and
   a display unit for displaying an integration result of the integrating unit.

2. A laser microscope apparatus according to claim 1, wherein the light-intensity measuring unit includes:
   a splitting element for splitting off the stimulus laser beam from a light path of the stimulus optical system;
   a detector for detecting a light intensity of the stimulus laser beam split off by the splitting element; and
   a correcting unit for converting a detection signal from the detector to a radiated light intensity of the stimulus laser beam at the specimen.

3. A laser microscope apparatus according to claim 1, wherein the image-acquisition optical system includes a first scanning optical system for scanning the observation laser beam.

4. A laser microscope apparatus according to claim 3, further comprising:
   a storage unit for storing a target integrated value of an irradiation level of the stimulus laser beam at the specimen;
   a decision unit for determining whether or not a calculation result of the integrating unit is greater than or equal to a target integrated value; and
   a control unit for controlling the stimulus optical system according to a determination result of the decision unit.

5. A laser microscope apparatus according to claim 4, wherein when the decision unit determines that the calculation result is greater than or equal to the target integrated value, the control unit stops irradiation of the stimulus laser beam from the stimulus optical system.

6. A laser microscope apparatus according to claim 4, wherein the stimulus optical system includes a second scanning optical system for scanning the stimulus laser beam.

7. A laser microscope apparatus according to claim 6, wherein when the stimulus laser beam is irradiated by scanning over an irradiation region that is set in advance, the decision unit performs the determination in each of a plurality of regions constituting the irradiation region.

8. A laser microscope apparatus according to claim 7, wherein each of the plurality of regions corresponds to a pixel.

9. A laser microscope apparatus according to claim 7, further comprising an input unit for setting the irradiation region of the stimulus laser beam.

10. A laser microscope apparatus according to claim 6, wherein when the stimulus laser beam is irradiated by scanning over an irradiation region that is set in advance, the decision unit makes the determination after the stimulus laser beam irradiates the entire irradiation region.

11. A laser microscope apparatus according to claim 10, further comprising an input unit for setting the irradiation region of the stimulus laser beam.

12. A laser microscope apparatus according to claim 6, wherein the light-intensity measurement unit includes:
- a splitting element for splitting off the stimulus laser beam from a light path of the stimulus optical system;
- a detector for detecting a light intensity of the stimulus laser beam split off by the splitting element; and
- a correction unit for converting a detection signal from the detector into an irradiated light intensity of the stimulus laser beam at the specimen.

13. A laser microscope apparatus according to claim 4, further comprising an input unit for inputting the target integrated value.

14. A laser microscope apparatus according to claim 4, further comprising:
- a laser-irradiation-conditions determining unit for determining an irradiation time and intensity of the stimulus laser beam based on the target integrated value, wherein the control unit controls the stimulus optical system based on the irradiation time and the intensity determined by the laser-irradiation-conditions determining unit.

15. A light-amount detection unit used in a laser microscope including a stimulus optical system for irradiating a stimulus laser beam for applying a stimulus to a specific position of a specimen, comprising:
- a light-intensity measuring unit for measuring a light intensity of the stimulus laser beam;
- an integrating unit which integrates light intensity data output over time by the light-intensity measuring unit to calculate a total light amount of the stimulus laser beam that has irradiated the specimen; and
- an output unit for outputting an integration result of the integrating unit.

* * * * *